(12) United States Patent
Schmierer

(10) Patent No.: US 8,696,148 B2
(45) Date of Patent: Apr. 15, 2014

(54) SCREWS AS BRACKET MOUNTING ELEMENT

(75) Inventor: Arne Schmierer, Kirchheim (DE)

(73) Assignee: SMR Patents S.a.r.l., Luxembourg (LU)

( * ) Notice: Subject to any disclaimer, the term of this patent is extended or adjusted under 35 U.S.C. 154(b) by 181 days.

(21) Appl. No.: 12/764,014

(22) Filed: Apr. 20, 2010

(65) Prior Publication Data

US 2010/0264289 A1   Oct. 21, 2010

(30) Foreign Application Priority Data

Apr. 20, 2009   (DE) .......................... 10 2009 019 091

(51) Int. Cl.
    *G02B 7/182*   (2006.01)
(52) U.S. Cl.
    USPC ......... 359/871; 359/872; 359/841; 248/475.1
(58) Field of Classification Search
    USPC ............... 248/475.1, 466, 476, 479; 359/509, 359/507, 514, 838, 841, 871, 872
    See application file for complete search history.

(56) References Cited

U.S. PATENT DOCUMENTS

| | | | |
|---|---|---|---|
| 4,561,732 A * | 12/1985 | Japes ............................ | 359/509 |
| 6,012,817 A * | 1/2000 | Kamakura et al. ............ | 359/509 |
| 6,290,361 B1 * | 9/2001 | Berzin ........................... | 359/507 |
| 6,755,541 B2 * | 6/2004 | Nakano et al. ................ | 353/119 |
| 6,755,543 B1 * | 6/2004 | Foote et al. ................... | 359/877 |
| 2009/0086347 A1 * | 4/2009 | Kawamura .................... | 359/841 |
| 2009/0115631 A1 * | 5/2009 | Foote et al. ................... | 340/901 |

FOREIGN PATENT DOCUMENTS

| | | |
|---|---|---|
| DE | 1952364 | 4/1971 |
| DE | 8111782.5 | 4/1981 |
| DE | 4323534 | 1/1995 |
| DE | 10121400 | 11/2002 |
| GB | 1403588 | 8/1975 |
| GB | 1473431 | 5/1977 |
| GB | 1503405 | 3/1978 |

OTHER PUBLICATIONS

European Search Report for application No. EP 10 15 7483 dated Jul. 1, 2010.
German Search Report for German Patent Application 10 2009 019 091.0-51 dated Nov. 23, 2009.

* cited by examiner

*Primary Examiner* — Tobb M Epps

(74) *Attorney, Agent, or Firm* — Reising Ethington PC

(57) ABSTRACT

A mirror base is proposed that is extruded at least partially out of plastic and which retains its rigidity via long steel bolts, which at the same time produce the fastening to the vehicle.

9 Claims, 4 Drawing Sheets

SCREWS AS BRACKET MOUNTING ELEMENT

The invention is based on a priority patent application DE102009019091.0 which is hereby incorporated by reference.

BACKGROUND OF THE INVENTION

1. Field of the Invention

The present invention is concerned with the design of a mirror base, which does without metallic mirror components designed to be large. The mirror base according to the invention has a novel fastening for generation of stability.

2. Description of the Related Art

In the prior art, mirror bases are manufactured from die casting. These metallic components are in a position to absorb the forces arising, and to generate a warp-resistant joining between vehicle and mirror base. Manufacturing metallic die casting components or the required complexity and precision is not easy. Moreover, metallic mirror bases are heavy and hence raise the weight of the whole vehicle and hence the $CO_2$ output.

Mirror bases made of plastic are also known. In the publication Plastic Processor 53, 2002 no. 10 pages 136-138 it is described how the mirror substrate base hitherto consisting of aluminium, is replaced by a foot made of Ultradur B 4040 G10. This was made possible above all by the high e-module of around 19000 $N/mm^2$, which contributes to low-vibration installation of the rear-view mirror and hence to an unimpeded view. Straight exterior mirrors often encounter obstacles in automobile travel and have to endure abrupt strains without damage. The high level of impact resistance of the material helps in bearing these blows without damage. Hitherto expensive reworking of the aluminium parts can be dispensed with. This contributes towards a cost saving, as well as a weight advantage, of approximately 60%.

From DE 8111782 a mirror construction with a multi-part mirror base is known, in which the mirror base is screwed together with an angle piece. The screwing on thereby serves in joining the components and not in attaching the mirror base onto a vehicle body.

SUMMARY OF THE INVENTION

The object of the invention is to provide a mirror including a fastening that enables a substantial reduction in weight and simplifies mounting. The mirror base at least partially extruded out of plastic drastically reduces the weight of the whole exterior mirror. The mirror base according to the invention additionally has fastening bolts that produce the required precision and torsional stiffness together with the plastic mirror base. Further advantages and embodiments are laid out in the following description.

DETAILED DESCRIPTION OF THE DRAWINGS

Figure 1:
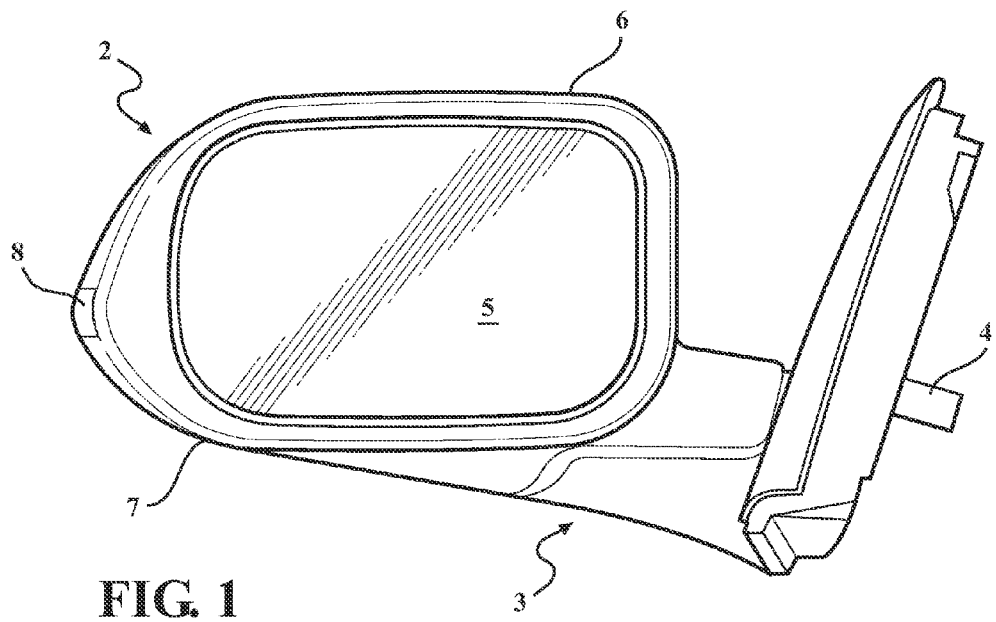
FIG. 1 shows an exterior mirror in the prior art.

Exterior mirrors are depicted as examples in the prior art as in FIG. 1, made of a mirror head 2 and a mirror base with mirror base covering 3. The exterior mirror is joined to the vehicle by the mirror base, which in this drawing is located inside of the covering 3, and has a rotatable connection for the mirror head 2. The mirror head is provided, as an example, with a mirror frame 7 that comprises a reflective glass surface. In this example, the exterior mirror still has an indicator module 8. The mirror base is screwed onto the vehicle with fastenings 4. In the prior art the plastic parts of the mirror housing 6 as well as the mirror base covering 3 encompass metallic components that consist of the mirror base and a carrier plate in the mirror head and which are not visible in the drawing.

Figure 2:
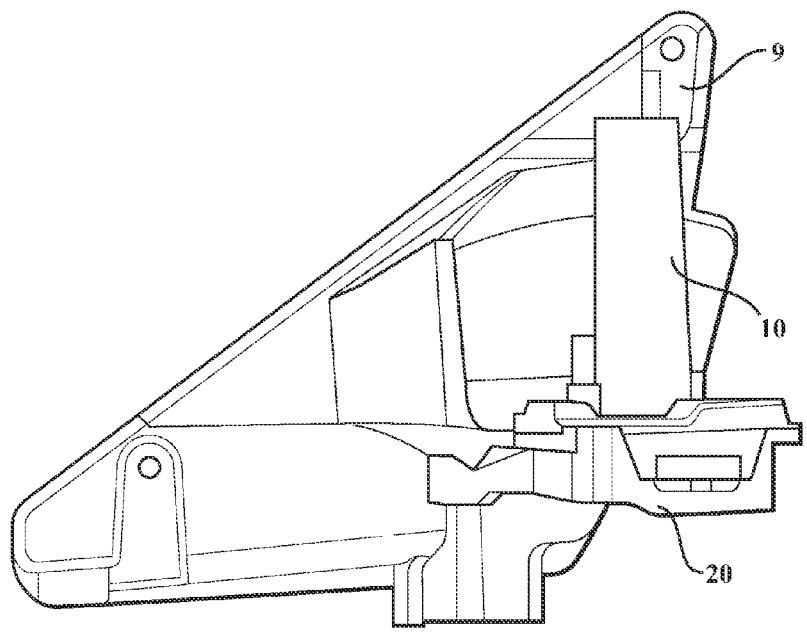
FIG. 2 shows a plastic mirror base according to the invention.

FIG. 2 shows an example of a mirror base in the view towards the vehicle, as it is produced by die casting in the prior art. The component has various ridges that produce stability without too much material being used. The mirror base has a carrier 20 for an axle of rotation 10 for manual or motorized turning of the mirror head away from the vehicle. This joint must be sufficiently supported by the mirror base material. The mirror base 9 has screw bosses on the reverse side, facing away from the vehicle, with which the mirror base is bolted onto the vehicle.

There are increasing attempts in the series of replacing at least part of the metallic components by stable plastics. Carrier plates in the mirror head are therefore already produced out of plastic, but also mirror base structures.

Figure 3:
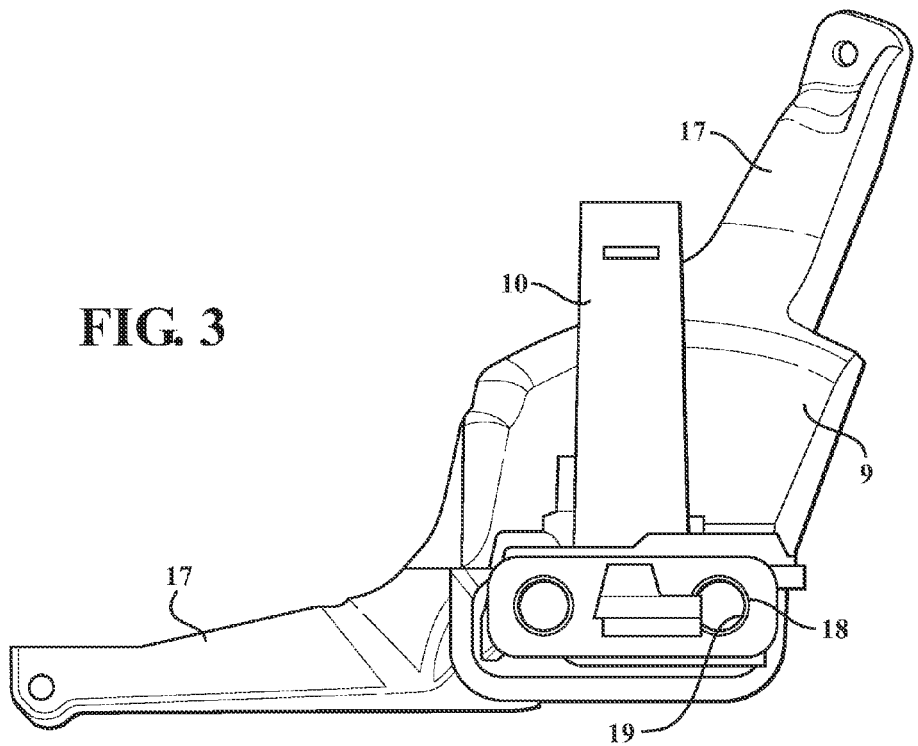
FIG. 3 shows the mirror base according to the invention with threaded body.

The mirror base according to the invention according to FIG. 3 is extruded in one piece out of a plastic piece. The mirror base is depicted in FIG. 3 in a view from outside on the vehicle exterior. In the embodiment according to FIG. 3, the mirror base has a base area that is mounted on the vehicle in the form of two brackets 17. The two brackets 17 end in eyes that serve in the screwing on of the mirror base covering. They are not important for the embodiment of the invention. The mirror base 9 has, in its extension in the direction of the vehicle, a carrying structure 20 and an axle for receiving the rotatable mirror head.

Figure 6:
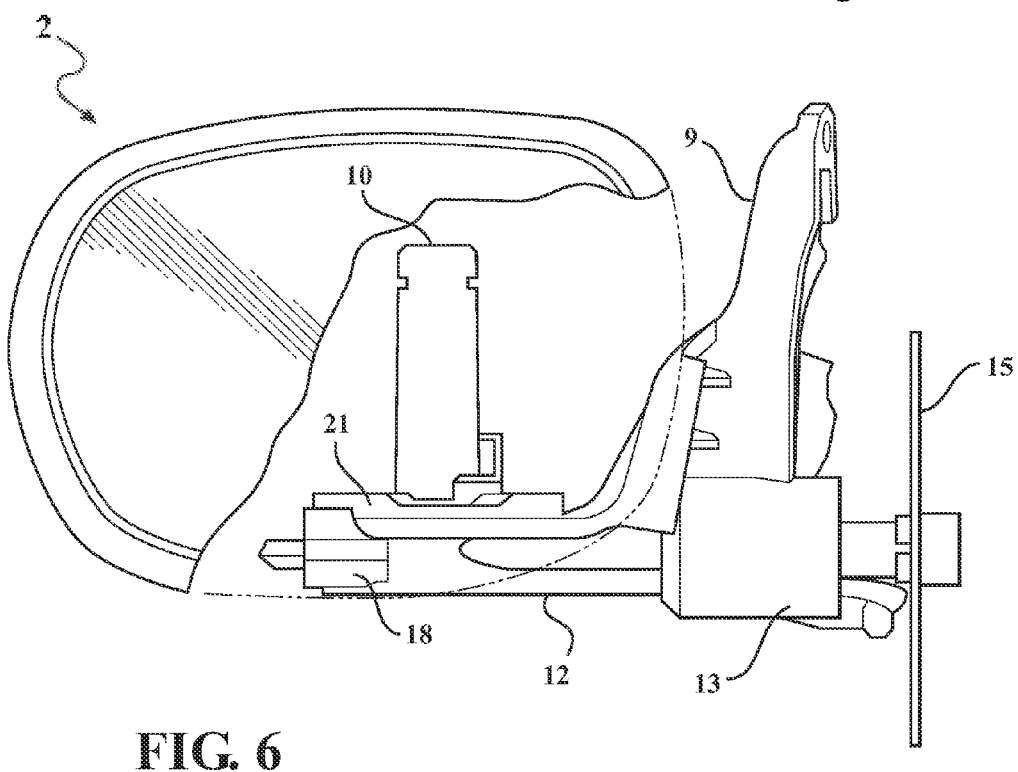
FIG. 6 shows a longitudinal section through the mirror base according to the invention.

Furthermore, a threaded body 18 having threads 19 can be seen on the front side, as a limit of the carrying structure 20 towards the mirror head 2, a body which in this embodiment is sketched as a separate component (best seen in FIG. 6).

Figure 4:
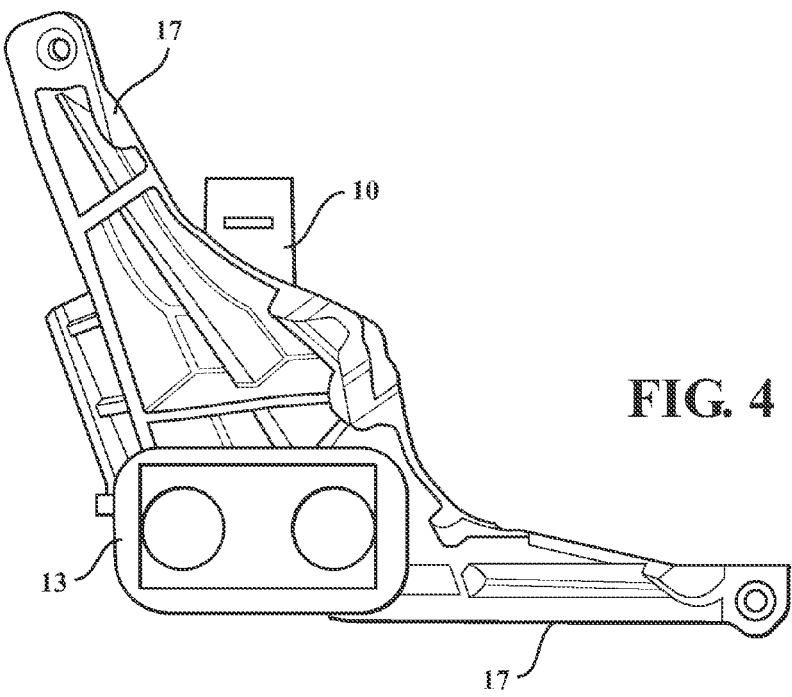
FIG. 4 shows a mirror base according to the invention with contact surface.

FIG. 4 shows the same mirror base from its vehicle side. A contact surface 13 for carrying out the bolting on can be recognized.

Figure 5:
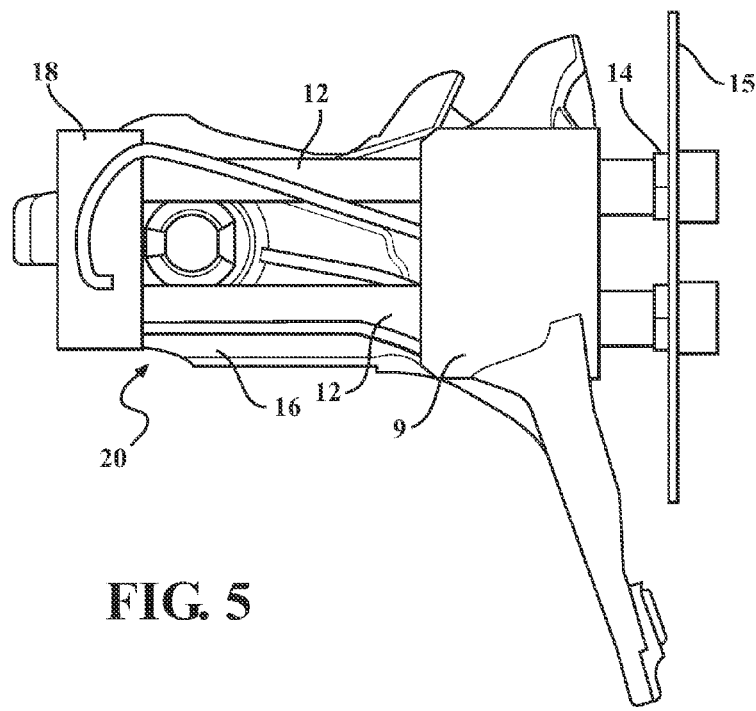
FIG. 5 shows a view from above on the mirror base according to the invention.

FIG. 5 shows the mirror base according to the invention from beneath. Two fastening bolts 12 are fed through the mirror base 9. The contact surface 13 is thereby located on the vehicle side and serves to receive the bolt heads 14. The bolts 12 rung along the length of the whole mirror base, wherein in the mirror base structures are constructed into which the bolts are fed. For example, ridges 16 are constructed, on which the bolts lie. The threaded body 18 receives the bolts at the end and contains a thread in which the bolts can be locked. The gap of the two bolts is thereby chosen at maximum and corresponds to the width b of the mirror base in the area of the axle of rotation 10.

Both threaded body 18 and the contact surface 13 are directly extruded with the mirror base made of a material in an advantageous embodiment.

FIG. 6 shows a longitudinal section of the mirror base according to the invention. The bolt 12 leads from the vehicle 15, through the contact surface 13 via the mirror base 9 into the threaded body 18, in which it is bolted on. The bolts 12 carry the whole mirror base and hence the whole exterior mirror. The length of the bolts corresponds to the length l of the mirror foot 9. The bolts extend under the axle of rotation 10.

Figure 7:
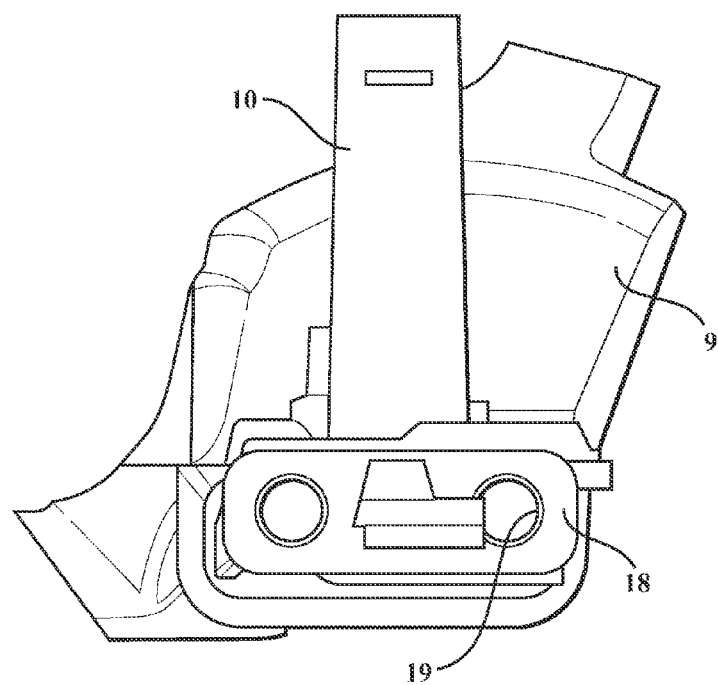
FIG. 7 shows a mirror base with reduced brackets.

FIG. 7 shows a further reduced mirror base solution, the brackets of which 17 are set at a minimum.

The solution according to the invention is shown as a combination of materials. The light plastic material alone would not be in a position to carry a heavy mirror base. The material would not have the necessary stiffness and resistance to vibration that is required. Therefore, steel bolts 12 are introduced in order to achieve the necessary elasticity, but also stiffness. As exterior mirrors are in any case bolted onto the vehicle, the use of special bolts that carry the mirror base along their length is a step towards a cost-effective solution. The length of the bolts is dimensioned in such a way that they run along the whole mirror base. The threaded body 18 on the outside of the mirror base is either made out of metal or equally extruded in plastic, wherein improvement can possibly be achieved for a bolting on by metallic inserts. The solution according to the invention reduces the structural expense for manufacture and assembly of a mirror base considerably. The solution reduces the total weight of a mirror base with a simple and cost-effective fastening form.

A further embodiment uses plastic for the mirror base, but die casting material for the manufacture of the axle of rotation 10 and its base on the mirror base.

The axle of rotation with base 21, along with the threaded body 18, can thereby be manufactured out of a die casting piece, such as is indicated in FIG. 6 by grey shading.

The whole mirror base 9 is optimized in combination of the materials. The contact surface 13 and the threaded body 18 are manufactured alternatively out of die casting or plastic. The choice of material is determined by the dimensions of the mirror base and the requirements with respect to its resistance to vibration.

The important component is the fastening bolts. The invention is thereby not limited to an embodiment with two bolts, several bolts or a single bolt can also be used.

The invention claimed is:

1. An exterior mirror assembly fixedly secured to a vehicle side of a vehicle, said exterior mirror assembly comprising:
   a mirror base, the mirror base consisting of a contact surface on the vehicle side and a carrying structure extending out from the contact surface, the mirror base defining a threaded body;
   a mirror head operatively connected to the carrying structure of the mirror base;
   an axle secured to and extending through the carrying structure and the mirror base and extending into the mirror head for rotation of the mirror head about the axle, the axle being suited for manual or motorized turning of the mirror head away from and toward the vehicle;
   a bolt for securing the mirror base to the vehicle, the bolt leading from the vehicle, through the contact surface via the mirror base into the threaded body, in which the exterior mirror assembly is locked via a thread and bolted on, the bolt carrying the exterior mirror assembly by
   extending from the contact surface of the mirror base up to and directly below the axle.

2. The exterior mirror assembly according to claim 1, wherein said threaded body for receiving said bolt extends over a width of the mirror base in the area of an axle.

3. The exterior mirror assembly according to claim 1, wherein said threaded body for receiving the bolt consists at least partially of additional components.

4. The exterior mirror assembly according to claim 1, wherein said threaded body for receiving the bolt together with the mirror base are manufactured as one piece.

5. The exterior mirror assembly according to claim 1, wherein said threaded body for receiving the bolt includes a metal insert for structural strengthening.

6. The exterior mirror assembly according to claim 1, including a second bolt for securing the mirror base onto the vehicle.

7. The exterior mirror assembly according to claim 1, wherein said mirror base is manufactured as one piece out of plastic.

8. The exterior mirror assembly according to claim 1, wherein said carrying structure for an axle of rotation is manufactured out of die casting.

9. The exterior mirror assembly according to claim 8, wherein said threaded body and said carrying structure for an axle of rotation are manufactured as one piece with said mirror base.

* * * * *